United States Patent [19]

Courneya

[11] 4,351,651

[45] Sep. 28, 1982

[54] APPARATUS FOR EXTRACTING POTABLE WATER

[76] Inventor: Calice G. Courneya, Route 7, Alexandria, Minn. 56308

[21] Appl. No.: 215,967

[22] Filed: Dec. 12, 1980

[51] Int. Cl.³ .............................................. B01D 46/00
[52] U.S. Cl. ...................................... 55/210; 55/217; 55/267; 55/417; 55/467; 55/459 R; 62/93; 62/260; 165/45; 165/111; 165/40
[58] Field of Search .................. 55/210, 217, 267–269, 55/80, 459 R, 417; 60/648; 62/93, 260; 138/43, 45, 46, 40, 42, 44; 165/111, 45, 40; 236/93

[56] References Cited

U.S. PATENT DOCUMENTS

| | | | |
|---|---|---|---|
| 404,217 | 5/1889 | Morse | 55/459 R |
| 654,264 | 7/1900 | Leuder et al. | 62/260 |
| 983,424 | 2/1911 | Brosius . | |
| 2,077,315 | 4/1937 | Ewing et al. | 62/260 |
| 2,189,895 | 2/1940 | Grutzner | 55/417 |
| 2,708,834 | 5/1955 | Dodge | 62/93 |
| 3,127,330 | 3/1964 | Katz . | |
| 3,257,291 | 6/1966 | Gerber . | |
| 3,284,318 | 11/1966 | Coanda . | |
| 3,347,753 | 10/1967 | Morse . | |
| 3,357,898 | 12/1967 | Novakovich . | |
| 3,361,645 | 1/1968 | Bodell . | |
| 3,363,664 | 1/1968 | Villanveva . | |
| 3,489,072 | 1/1970 | Secor . | |
| 3,498,077 | 3/1970 | Gerard et al. | 62/260 |
| 3,578,567 | 5/1971 | Malvin et al. . | |
| 3,695,010 | 10/1972 | Barrett | 55/385 C |
| 3,748,867 | 7/1973 | Hamri . | |
| 3,847,066 | 11/1974 | Van der Ham | 236/93 |
| 3,860,492 | 1/1975 | Lowi et al. . | |
| 4,159,078 | 6/1979 | Diermayer et al. | 236/93 R |
| 4,159,228 | 6/1979 | Bellande et al. . | |
| 4,172,767 | 10/1979 | Sear . | |
| 4,234,037 | 11/1980 | Rogers et al. | 165/45 |

FOREIGN PATENT DOCUMENTS 606644  11/1978  Switzerland ........................... 55/80

*Primary Examiner*—Bernard Nozick
*Attorney, Agent, or Firm*—Wicks & Nemer

[57] ABSTRACT

Apparatus and method for extracting potable water are disclosed in preferred form as extracting drinking water from moisture-laden air at atmospheric temperature through the use of a heat exchanger at or near subsurface temperature which is in air communication with the atmosphere for allowing atmospheric moisture-laden air to enter, pass through, cool, arrive at its dew point, allow the moisture in the air to precipitate out, and allow the air to pass outward to the atmosphere again. Suitable apparatus may be provided to restrict air flow and allow sufficient residence time of the air in the heat exchanger to allow sufficient precipitation. Further, filtration may be provided on the air input and a means for creating a movement pressure, in the preferred form of a turbine, may be provided on the output. The water from the system of the present invention may then be collected and provided for human consumption in conventional manner.

16 Claims, 3 Drawing Figures

APPARATUS FOR EXTRACTING POTABLE WATER

BACKGROUND

The present invention relates generally to the creation of potable water, relates more specifically to a method and apparatus for the removal of potable water from air, and relates more specifically to a method and apparatus for removal of potable water from air through the use of a heat exchanger.

It is well known that potable water is scarce or nonexistent in many areas of the earth. Thus, many approaches to providing potable water have been attempted, including desalination of sea water and the towing of icebergs from Antarctica to arid regions.

Past techniques have suffered from deficiencies in construction and operating costs, complexity, maintenance, and the like, however.

SUMMARY

The present invention solves these and other problems in the obtaining of potable water by providing, in the preferred embodiment, a heat exchanger at or near subsurface temperature with an entrance port in communication with moisture-laden air at atmospheric temperature. In the preferred embodiment, filtration of the entrance port is provided. Atmospheric air is caused to enter the entrance port, pass through the heat exchanger in a controlled manner, and exit back to the atmosphere. In the preferred embodiment, means are provided to control the residence time in the heat exchanger by the moisture-laden air passing therethrough to better extract the water from the air. Further, in the preferred embodiment, an air turbine may be provided at the exit port to the atmosphere to create a negative pressure on air passing through the system. Water precipitating from the air passing through the heat exchanger may then be collected in a suitable reservoir or vessel and provided for human consumption by conventional means.

It is thus an object of the present invention to provide a novel method and apparatus for obtaining potable water.

It is a further object of the present invention to provide a novel method and apparatus for extraction of potable water from atmospheric air.

These and further objects and advantages of the present invention will become clearer in the light of the following detailed description of an illustrative embodiment of this invention described in connection with the drawings.

DESCRIPTION OF THE DRAWINGS

The illustrative embodiment of the present invention may best be described by reference to the accompanying drawings where.

Figure 1:
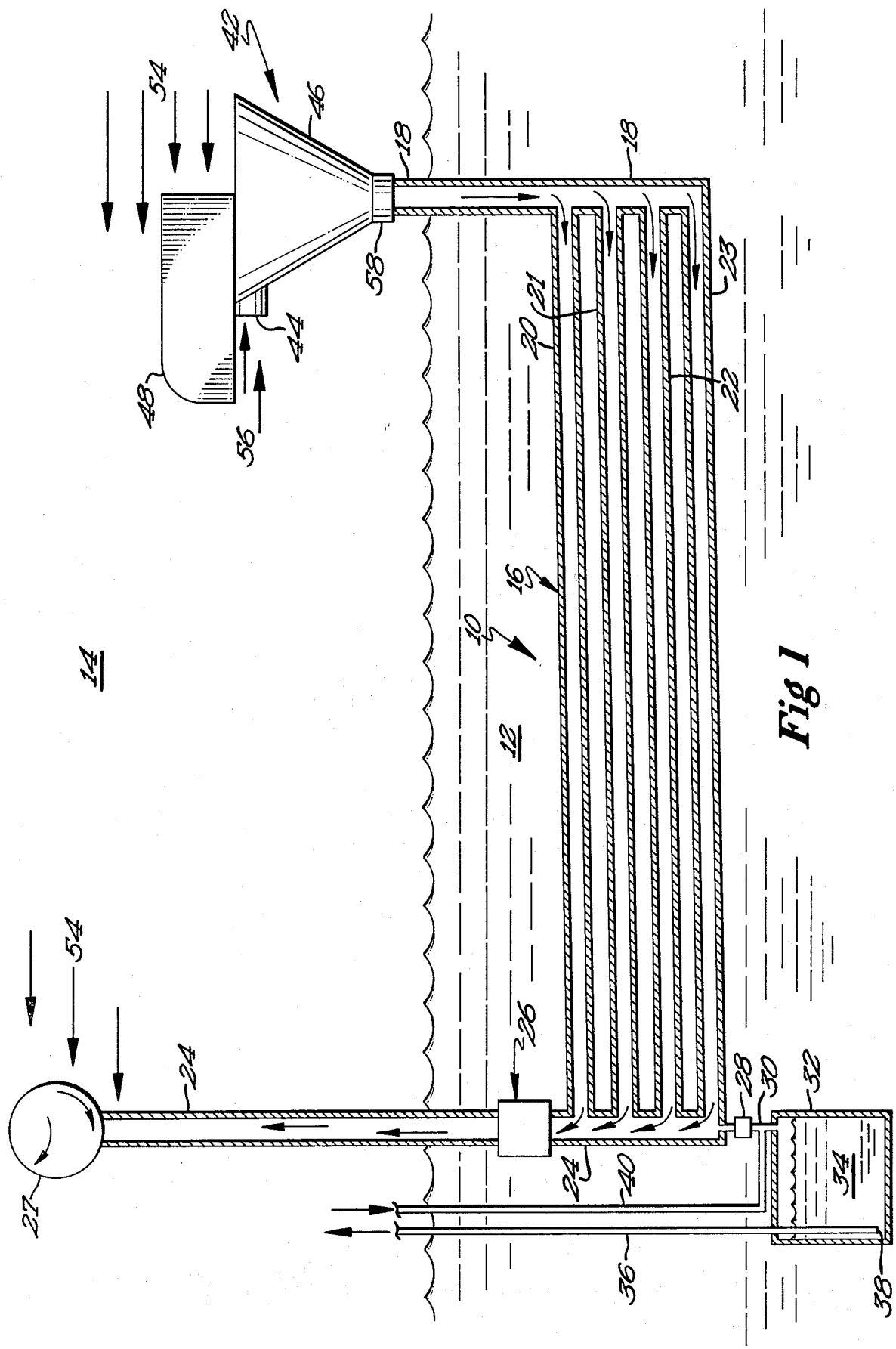
FIG. 1 shows a schematic, diagramatic overall view of an illustrative embodiment according to the present invention.

All figures are drawn for ease of explanation of the basic teachings of the present invention only. The extension of the figures with respect to number, position, relationship, and dimension of the parts to form a preferred embodiment will be explained or will be obvious to those skilled in the art from the explanation given.

When used in the various figures of the drawings, the same numerals designate the same or similar parts. Furthermore, when "right", "left", "front", "back", "vertical", "horizontal", "top", and similar terms are used herein, it should be understood that these terms have reference only to the structure shown in the drawings as it would appear to a person viewing the drawings and may be utilized only to facilitate describing the present invention.

DESCRIPTION

In FIG. 1, a system according to the present invention is shown and generally designated 10. System 10 is then shown as imbedded in ground 12, although it may as well be imbedded in other media, such as a body of water. Above ground 12 is seen to be the atmosphere indicated as 14. The potable water to be extracted by the present invention is then from the moisture-laden air of atmosphere 14.

The present invention then includes a cold heat exchanger generally designated as 16 arranged to have a temperature at or near subsurface temperature. Thus, in the embodiment shown, heat exchanger 16 is buried in ground 12. Cold heat exchanger 16 then includes a generally vertically arranged entrance pipe 18 and four generally transversely arranged heat exhanger pipes or tubes 20, 21, 22, and 23 in the embodiment shown. In the preferred embodiment shown heat exchanger pipes 20–23 are preferrably generally horizontally arranged. Pipes 20–23 shown then extend for a significant distance in a generally horizontal direction and join a generally vertically arranged exit pipe or tube 24.

In the preferred embodiment shown, exit pipe 24, at its upper end includes a turbine generally designated 27. Turbine 27 may be of standard or conventional design. In the preferred embodiment shown exit pipe 24 also includes a means 26 for restricting the flow of air out of the heat exchanger apparatus 16 as will be explained in further detail hereinafter.

At its lower end, exit pipe 24 includes a conventional check valve 28 which in turn provides fluid communication to a pipe 30 and to a reservoir or a storage vessel 32 for water designated 34. A further pipe 36 is then provided into reservoir 32 and has its lower end 38 terminating adjacent the bottom of reservoir 32. Pipe 36 provides an exit port for the potable water extracted by the present system. Pipe 30 also includes the fluidic intersection with a third pipe 40 which can provide a source of pressurization to reservoir 32 to allow the extraction of water 34 therefrom.

In the preferred embodiment shown, entrance pipe 18 further includes filtration apparatus generally designated 42 which includes a port 44 in fluid communication with atmospheric air 14, a cyclonic separator portion 46 as will be explained further hereinafter, and a vane 48 as will be further explained hereinafter in relation to FIG. 2.

Figure 2:
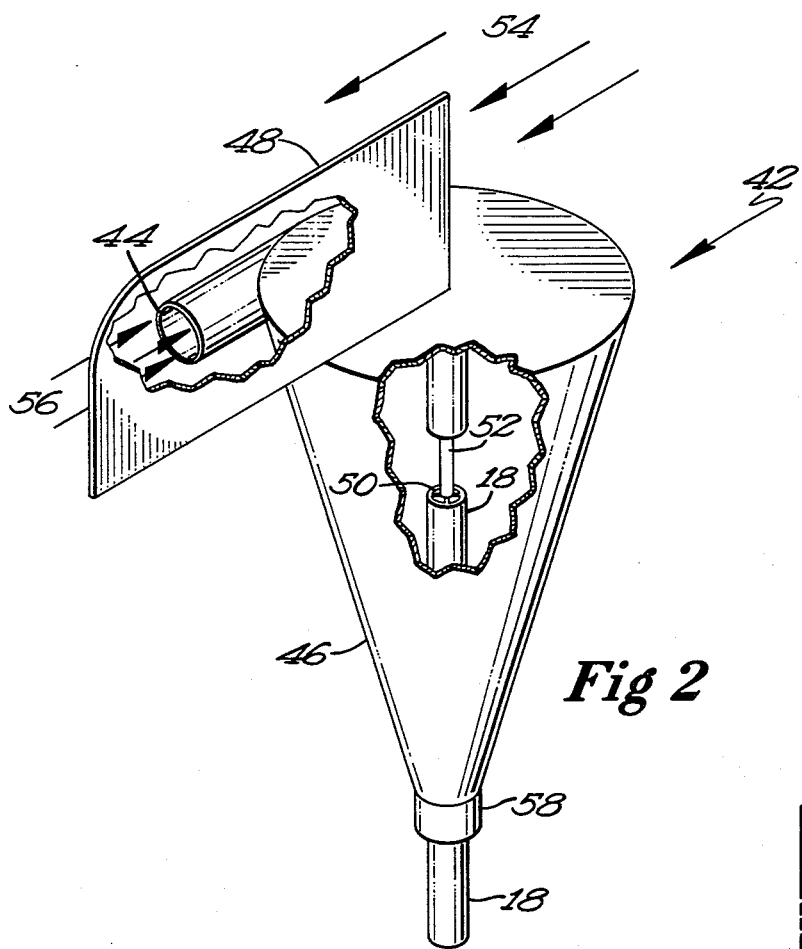
FIG. 2 shows a preferred form of a component of the system of FIG. 1.

In FIG. 2, the filtration apparatus 42 of FIG. 1 is shown in greater detail. Entrance pipe 18 is shown as leading to cyclonic portion 46. A portion of cyclonic portion 46 is broken away to reveal the upper termination of entrance pipe 18 which supports a bearing member 50 which in turn supports a shaft 52 which allows vane member 48 to circularly pivot in the wind. The wind is diagramatically drawn as 54 and is seen as moving vane 48 in the opposite direction therefrom. Filter entrance port 44 is then seen in greater detail as allowing the entrance of air 56. Vane 48 then should be of adequate area to prevent the in-rush of air at port 44 from causing filter apparatus 42 to turn. Air 56 then enters port 44 and is directed cyclonically through filter apparatus 42 and ultimately into entrance pipe 18. The particles within the entering air 56 which are cyclonically separated from the air within filter 42 are then thrown by centrifugal force to the outside, slide down the cone-shaped cyclonic separator 46 and exit at the open bottom thereof as at 58. The bottom of cone-shaped cyclonic separator 46 is then large enough to permit the passage of particle filtrate between the housing 46 and entrance pipe 18.

While cyclonic separator 42 is deemed of particular value because of its lack of maintenance, many other sources of filtration will be obvious to one skilled in the art once the teachings of the present invention have been explained and set out. Of course, no filtration may be needed or desired. It will be noted, however, that by utilization of the filtration apparatus 42, air 56 enters upwind, and thus it is believed less laden with dust and other particulate matter which may be desired to be later filtered out before human consumption.

Now that the present invention has been described in its basic form, the novelty and subtleties of the present invention may be appreciated. The system 10 of the present invention then provides an apparatus and a method for the removal of water, such as 34, from air, such as 14, and the storage of that water for human consumption, as in reservoir 32. Water may be provided in areas where no reasonable potable water supply is present or is present in an inadequate amount. The present invention utilizes the moisture content of air passing over an area of land or water and causes the moisture-laden air to flow through the apparatus 10 of the present invention. The present invention then causes the removal or separation of the water from the air by taking advantage of the difference in temperature between the air 14 above and the lower temperature of the earth or other subsurface media 12, below.

Thus, moisture-laden air 54 in the form of wind drives exhaust turbine 27, which may be of conventional design. Turbine 27 then causes a decrease in air pressure within exit pipe 24 thus creating an upward draft through the flow regulator 26, from exit pipe 24, from cold heat exchanger 16, from entrance pipe 18, and from filtration apparatus 42 and ultimately through entrance port 44. Thus, all of these components are in air-fluid communication.

As the moisture-laden air 56 enters port 44, wind blown particles which may be taken in are separated by centrifugal force within filtration apparatus 42 and are expelled out of opening 58 as described hereinbefore. The cleaner moisture-laden air then passes down through the upper termination of port 18, best seen in FIG. 2, and through entrance pipe 18. From entrance pipe 18, the moisture-laden air enters the many passages of cold heat exchanger 16. Heat exchanger 16 is indicated as having four conduits, but it will be recognized that more or fewer may be provided within the teachings of the current invention.

Since the cold heat exchanger 16 is imbedded in the soil, water or other subsurface media in temperature communication with the earth, the temperature of cold heat exchanger 16 is lower than the temperature of air 14 and hence entering air 56. As entering air 56 passes through cold heat exchanger 16, the moisture-laden air passively cools, and begins to arrive at its dew point. The moisture within the air 56 within cold heat exchanger 16 then begins to precipitate or separate from air 56 and collect on the inner surfaces of the individual pipes 20-23 forming cold heat exchanger 16. The water then flows towards exit pipe 24, by the simple expedient of a very slight downward gradient to pipes 20-23, through valve 28, through pipe 30, and into reservoir 32 to collet as water 34.

Air pressure may then be applied to pipe 40 in a conventional fashion to cause check valve 28 to close under this pressure. Air pressure within pipe 40 would then pressurize tank 34 and cause the water 34 to exit through end 38 of pipe 36 and be available for human consumption in a conventional fashion.

Because it is possible that air flow through apparatus 10 of the present invention could exceed the heat exchanger capability of the subsurface area of cold heat exchanger 16 and thus air could pass through apparatus 10 of the present invention without sufficient cooling, as in the preferred case to or near its dew point, it may be advisable to control the flow of air out of apparatus 10 by restricting its flow according to temperature or dew point, as by flow restrictor 26. It is to be recognized, however, that flow restrictor 26 is not necessary. Flow restrictor 26 may optimize recovery of water from the present invention, but recovery may be had with or without a flow restrictor or regulator.

It can now be recognized that it is desirable to cool air to as near subsurface temperature in media 12 as it is practical. Thus, to optimize operation of the present invention, flow restrictor device 26 is inserted into exit pipe 24 above heat exchanger 16 and preferably within subsurface media 12 and restricts the flow of air to greater degree as the temperature of exhaust air through exit pipe 24 increases to thereby increase the residence time of the air passing through the system of the present invention in exchanger 16. With the increased passage time, an increased likelihood exists of the air within system 10 of the present invention reaching as low as temperature as possible and thus releasing the maximum amount of moisture possible.

Figure 3:
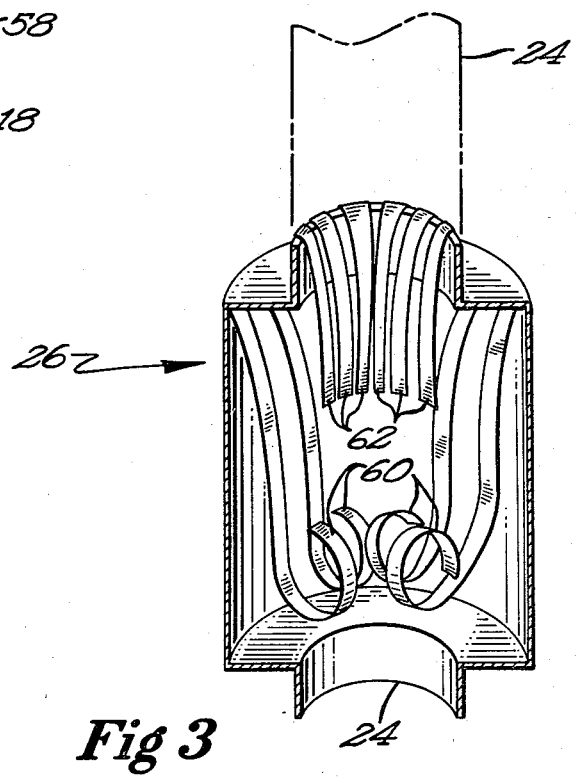
FIG. 3 shows a preferred form of another of the components of the system of FIG. 1.

A preferred embodiment of flow restrictor device 26 is illustrated in FIG. 3. As seen, flow restrictor 26 is cylindrical drum-like structure interrupting exit port 24. Biplastic laminated strips 60 and 62 are then suspended in the major portion of the drum-like container forming flow restrictor 26. Biplastic strips are then temperature sensitive and tend to curl or uncurl with slight changes in temperature. Thus, biplastic strips 60 and 62 are comprised of a plurality of laminants with different thermal coefficients of expansion. The action created by the laminating metals is well known as a bimetal strip. Strips 60 and 62 then curl to block the top exit port 24 in the event that the temperature of the air exiting is too high. The closer the temperature of the existing air is to the optimum figure chosen, the less curl exists for biplastic laminated strips 60, and the more they remain out of the direct air stream and avoid flow restriction. As the temperature of the exiting air increases, the curl of strips 60 increases to thus more and more block the flow of air between the top and bottom portions of exit pipe 24 to thus provide a fluid restriction and cause a longer transit and residence time to air passing through cold air exchanger 16 of the present system. Strips 62 are included as a safeguard device to close the top opening of flow restrictor 26 to exit pipe 24 under a condition of very high wind which would exceed the control parameters of strips 60.

Of course, other methods exist to maximize extraction, such as longer pipes 20-23, larger internal surface area of pipes 20-23, matched thermal conductivity, and arrangements to better cool the air.

Specification of components for the embodiment shown may now be set out. It will be realized by those skilled in the art that no limitation to these particular values is intended, and the values are given as a guide and an aid to persons lawfully using and utilizing the present invention.

In the example to be explained with respect to the embodiment 10 described, cold heat exchanger 16 is buried in the ground such that the distance from the ground surface to the top surface of pipe 20, as shown in FIG. 1, is approximately 9 feet. Entrance pipe 18 is then formed of 3 inch in diameter, schedule 40, polyvinyl chloride (PVC) pipe which is approximately 10 feet in length, terminating just near the ground. It will be recognized that this is an advantage because the greatest humidity in the atmosphere is near the surface. It will also be appreciated that the entry of dust and dirt should be avoided.

Heat exchanger pipes or tubes 20-23 are then formed of 1½ inch, sechedule 40, polyvinyl chloride (PVC) pipe and are each 20 feet in length. It will be immediately recognized that no limitation to this length or diameter is intended, but water production values will be given for this particular model.

Exit pipe 24 is similarly from schedule 40 polyvinyl chloride (PVC) pipe having a 3 inch diameter and extending approximately 11 feet above the ground for a total length of approximately 20 feet. The joinder of entrance pipe 18 and tubes 20-23 and the joinder of exit pipe 24 and tubes 20-23 may then be formed from reducing T's also of polyvnyl chloride (PVC) for convenience of construction.

Also for convenience, air restrictor 26 may be formed of a 6 inch coupling and 2 6×3 inch reducing bushings, all of polyvinyl chloride (PVC) material to thus define housing 26 in a most convenient manner. Remaining piping portions of the system may then also be of polyvinyl chloride (PVC) of lesser diameter.

It can now be recognized that entrance pipe 18 and heat exchanger pipes 20-23 are volume matched. A similar condition exists with respect to exit pipe 24.

Utilizing the dimensions of the specific example set out above and under the conditions that the exit air temperature within tube 24 and restrictor 26 is controlled to 45° Fahrenheit and with as little as a five mile per hour wind, an air passage rate of 2000 cubic feet of air per hour has been achieved. Three specific examples are then set forth below, one for an air temperature of 90° F., one for an air temperature of 80° F., and one for an air temperature of 70° F. It is to be noted that standard psychometric charts indicate that the density of dry air at 90° F. is 14.5 cubic feet per pound; at 80° F. is 14.3 cubic feet per pound; and at 70° F. is 13.7 cubic feet per pound. Further, a flow rate of 2000 cubic feet per hour for a 24 hour day translates into a flow capacity per day of 48,000 cubic feet per day. Therefore, with the density given above at 90° F., flow rate is 3,310 pounds of air per 24 hours; the flow rate for an 80° F. is 3,356.6 pounds of air per day; and at 70° F., the flow rate is 3,503.3 pounds of air per day.

With the above specification, three examples can now be set out. Three columns are given for each example, the left most column indicates the relative humidity of the air in percent, the center column indicates the pounds of water removal per pound of air passing through the system, and the right most column indicates the pounds of water extracted in a 24 hour period under the conditions set out.

EXAMPLE 1

For an inlet temperature of 90° F.

| % R.H. | water/pound | pounds/day |
| --- | --- | --- |
| 100 | .0260 | 85.97 |
| 90 | .0219 | 72.56 |
| 80 | .0185 | 61.24 |
| 70 | .0154 | 50.97 |
| 60 | .0120 | 39.72 |
| 50 | .0092 | 30.45 |
| 40 | .006 | 19.86 |
| 30 | .003 | 9.93 |
| 20 | .001 | 3.31 |

EXAMPLE 2

For an inlet temperature of 80° F.

| % R.H. | water/pound | pounds/day |
| --- | --- | --- |
| 100 | .0158 | 53.03 |
| 90 | .0138 | 46.32 |
| 80 | .0115 | 38.60 |
| 70 | .0092 | 30.88 |
| 60 | .007 | 23.50 |
| 50 | .0048 | 16.11 |
| 40 | .0062 | 20.80 |
| 30 | .0004 | 1.34 |

EXAMPLE 3

| % R.H. | water/pound | pounds/day |
| --- | --- | --- |
| 100 | .0095 | 33.28 |
| 90 | .0081 | 28.38 |
| 80 | .0064 | 22.42 |
| 70 | .0048 | 16.81 |
| 60 | .0033 | 11.56 |
| 50 | .0017 | 5.96 |
| 40 | .0 | <1.0 |

Now that the basic teachings of the present invention have been explained, many extensions and variations will be obvious to those having ordinary skill in the art, including those set out above.

What is claimed is:

1. Apparatus for extraction of potable water from moisture-laden atmospheric air, comprising, in combination: cold heat exchanger in temperature communication with the subsurface media of earth and providing for passage of moisture-laden air therethrough and providing for the extraction of water from such moisture-laden air by passive cooling of the air to or near the dew point of the air causing the water in the air to condense; air entrance means in air communication with the atmosphere and in air communication with the cold heat exchanger for providing moisture-laden air from the atmosphere to the cold heat exchanger; air exit means in air communication with the cold heat exchanger and in air communication with the atmosphere for providing moisture-drained air from the cold heat exchanger to the atmosphere; means for maximizing the amount of water condensed in the cold heat exchanger and for preventing the air flow from exceeding the heat exchanger capacity comprising an air restrictor in the air exit means for restricting the flow of air through the air exit means for increasing the residence time of the air passing through the cold heat exchanger wherein said restrictor restricts the flow of air to a greater degree as the temperature of the exhaust air through the exit means increases and/or restricts the flow of air to a greater degree as the velocity of the exhaust air through the exit means increases; means for causing air flow from the atmosphere, through the cold heat exchanger and back to the atmosphere; and a reservoir in fluid communication with the cold heat exchanger to collect water condensed out of the moisture-laden air in the cold heat exchanger.

2. The apparatus of claim 1 wherein the cold heat exchanger comprises a series of pipes generally horizontally arranged; wherein the air entrance means comprises at least one pipe generally vertically arranged; and wherein the air exit means comprises at least one pipe generally vertically arranged.

3. The apparatus of claim 2 wherein the air entrance means further includes at least one air filter.

4. The apparatus of claim 1 wherein the air restrictor restricts the flow of air dependent on both the temperature and velocity of the exhaust air through the exit means to increase the residence time of the air passing through the cold heat exchanger so that the air flow does not exceed the heat exchanger capability and to maximize the amount of water condensed in the cold heat exchanger.

5. The apparatus of claim 1 or 4 wherein the air restrictor includes a housing; and biplastic temperature sensitive strips hung in the housing in a manner to curl and uncurl into and out of the air passageway to thus provide a restriction of air, with the curl dependent on temperature of the air.

6. The apparatus of claim 1 or 4 wherein the air restrictor includes a housing; and strips hung in the housing in a manner to close and unclose the air passageway to thus provide a restriction of air, dependent on the velocity of the air.

7. The apparatus of claim 1 wherein the reservoir is not in air communication with the air in the cold heat exchanger and is buried in the subsurface media of earth.

8. The apparatus of claim 1 or 7 wherein the reservoir includes a first pipe terminating adjacent the bottom of the reservoir and a second pipe for pressurizing the interior of the reservoir allowing the extraction of the water through the first pipe.

9. The apparatus of claim 1 wherein the air entrance means further includes a self-cleaning air filter.

10. Apparatus for extraction of potable water from moisture-laden atmospheric air, comprising, in combination: cold heat exchanger in temperature communication with the subsurface media of earth and providing for passage of moisture-laden air therethrough and providing for the extraction of water from such moisture-laden air by passive cooling of the air to or near the dew point of the air causing the water in the air to condense; air entrance means in air communication with the atmosphere and in air communication with the cold heat exchanger for providing moisture-laden air from the atmosphere to the cold heat exchanger; air exit means in air communication with the cold heat exchanger and in air communication with the atmosphere for providing moisture-drained air from the cold heat exchanger to the atmosphere; means for causing air flow from the atmosphere, through the cold heat exchanger and back to the atmosphere; a reservoir in fluid communication with the cold heat exchanger to collect water condensed out of the moisture-laden air in the cold heat exchanger; wherein the means for causing air flow through the system comprises a turbine arranged in air communication with the termination of the air exits means and operably communicating with the atmosphere for providing a wind driven source of pressure for the system.

11. The apparatus of claim 10 wherein the air restrictor restricts the flow of air to a greater degree as the temperature of the exhaust air through the exit means increases and/or restricts the flow of air to a greater degree as the velocity of the exhaust air through the exit means increases.

12. Apparatus for extraction of potable water from moisture-laden atmospheric air, comprising, in combination: cold heat exchanger in temperature communication with the subsurface media of earth and providing for passage of moisture-laden air therethrough and providing for the extraction of water from such moisture-laden air by passive cooling of the air to or near the dew point of the air causing the water in the air to condense; air entrance means in air communication with the atmosphere and in air communication with the cold heat exchanger for providing moisture-laden air from the atmosphere to the cold heat exchanger; air exit means in air communication with the cold heat exchanger and in air communication with the atmosphere for providing moisture-drained air from the cold heat exchanger to the atmosphere; means for causing air flow from the atmosphere, through the cold heat exchanger and back to the atmosphere; a reservoir in fluid communication with the cold heat exchanger to collect water condensed out of the moisture-laden air in the cold heat exchanger; and an air filter included in the air entrance means, wherein the air flow causing means is located in the air exit means and wherein the air filter comprises a cyclonic separator, with the separator including a cone-shaped portion, and an inlet formed in the cone-shaped portion for allowing the entrance of the air, with the air entrance means extending into the interior of the cone-shaped portion, and with the bottom of the cone-shaped portion being open to permit the exit of filtrate therethrough.

13. The apparatus of claim 12 wherein the air filter is circularly pivotal in the wind so that the inlet of the air filter is directed so that the air must enter the inlet of the air filter upwind.

14. Apparatus for extraction of potable water from moisture-laden atmospheric air comprising, in combination: a horizontally arranged cold heat exchanger in temperature communication with the subsurface media of earth and providing for the extraction of water from such moisture-laden air by passive cooling of the air to or near the dew point of the air causing the water in the air to condense; a vertically arranged atmospheric air entrance pipe in air communication with the cold heat exchanger and with the atmosphere for providing moisture-laden air from the atmosphere to the cold heat exchanger, with the air entrance pipe terminating near the subsurface media of earth; a cyclonic separator pivotally mounted upon and in communication with the air entrance pipe for filtering particles from the air before it enters the air entrance pipe including a cyclonic portion having an open bottom, an inlet, and a wind vane for pivoting the cyclonic separator on the air entrance pipe, with the inlet being arranged such that the air must enter the inlet upwind and thus be less laden with particles, with the air entrance pipe extending through the open bottom of the cyclonic portion and into the interior of the cyclonic portion, and with the open bottom of the cyclonic portion being large enough to permit the passage of particles filtered by the cyclonic separator from the cyclonic portion; a vertically arranged air exit pipe in air communication with the cold heat exchanger and with the atmosphere for providing moisture drained air from the cold heat exchanger to the atmosphere; an air restrictor located in the air exit pipe for restricting the flow of the air through the air exit pipe for increasing the residence time of the air passing through the cold heat exchanger including a first plurality of biplastic laminated strips having a length and a second plurality of biplastic laminated strips having a length, with the biplastic strips being temperature sensitive to curl or uncurl into and out of the air exit pipe with changes in temperature to thus provide a restriction of air through the air exit pipe and with the length of the first plurality of biplastic laminated strips being such that they close the air exit pipe under a condition of very high air velocity through the air exit pipe; a wind driven turbine mounted upon and in air communication with the air exit pipe for creating a decrease in air pressure in the air exit pipe for causing air flow from the atmosphere, through the cyclonic separator, the air entrance pipe, the cold heat exchanger, the air restrictor and the air exit pipe back to the atmosphere; a water reservoir located vertically below the cold heat exchanger for the collection of water condensed out of the moisture-laden air in the cold heat exchanger; a vertically arranged water pipe between the cold heat exchanger and the reservoir for providing water communication between the cold heat exchanger and the reservoir; and means for extracting the water from the reservoir.

15. The apparatus of claim 14 wherein the means for extracting the water from the reservoir comprises, in combination: a fourth water pipe in fluid communication with the reservoir; a fifth pressure pipe in fluid communication with the reservoir; a check valve formed in the water pipe in fluid communication between the reservoir and the cold heat exchanger allowing water passage from the cold heat exchanger to the reservoir but not from the reservoir to the cold heat exchanger; and means for pressurizing the fifth pipe for forcing the water from the reservoir and through the fourth pipe.

16. The apparatus of claim 14 wherein the cold heat exchanger comprises, in combination: at least four generally horizontally arranged heat exchanger pipes having first ends in air communication with the air entrance pipe and second ends in air communication with the air exit pipe, with the heat exchanger pipes having a diameter of 1½ inches and a length of 20 feet, with the air entrance pipe having a diameter of 3 inches and a length of 10 feet, and with the air exit pipe having a diameter of 3 inches and a length of 20 feet.

* * * * *

UNITED STATES PATENT OFFICE
CERTIFICATE OF CORRECTION

Patent No.  4,351,651   Dated  September 28, 1982

Inventor(s)   Calice G. Courneya

It is certified that error appears in the above-identified patent and that said Letters Patent are hereby corrected as shown below:

ON THE TITLE PAGE,

In REFERENCES CITED, after "3,363,664 1/1968 Villanveva" insert --3,414,481 12/1968 Kelly--.

IN THE DESCRIPTION
    Column 4, line 10 cancel "collet" and substitute therefor --collect--.

Column 5, line 26 cancel "sechedule" and substitute therefor --schedule--.

Column 5, line 37 cancel "polyvnyl" and substitute therefor --polyvinyl--.

Column 5, line 57 cancel "psychometric" and substitute therefor --psychrometric--.

IN THE CLAIMS
    Claim 11, line 1 after "the" insert --air exit means includes an--."

Claim 11, line 2 after "tor" insert --which--.

Signed and Sealed this

Twenty-ninth Day of March 1983

[SEAL]

Attest:

GERALD J. MOSSINGHOFF

Attesting Officer    Commissioner of Patents and Trademarks